(12) United States Patent
Gross et al.

(10) Patent No.: US 10,634,485 B2
(45) Date of Patent: Apr. 28, 2020

(54) DEVICE FOR CONTACTLESS OPTICAL DISTANCE MEASUREMENT

(71) Applicant: GRINTECH GmbH, Jena (DE)

(72) Inventors: Herbert Gross, Großpürschütz (DE); Bernhard Messerschmidt, Jena (DE); Minyi Zhong, Jena (DE); Marcel Kunze, Jena (DE)

(73) Assignee: GRINTECH GMBH, Jena (DE)

( * ) Notice: Subject to any disclaimer, the term of this patent is extended or adjusted under 35 U.S.C. 154(b) by 340 days.

(21) Appl. No.: 15/100,244

(22) PCT Filed: Nov. 12, 2014

(86) PCT No.: PCT/EP2014/074348
§ 371 (c)(1),
(2) Date: May 27, 2016

(87) PCT Pub. No.: WO2015/078693
PCT Pub. Date: Jun. 4, 2015

(65) Prior Publication Data
US 2016/0377411 A1    Dec. 29, 2016

(30) Foreign Application Priority Data
Nov. 29, 2013    (DE) .................... 10 2013 113 265

(51) Int. Cl.
*G01B 11/06* (2006.01)
*G01B 11/02* (2006.01)
*G02B 13/18* (2006.01)

(52) U.S. Cl.
CPC ........ *G01B 11/0608* (2013.01); *G01B 11/026* (2013.01); *G02B 13/18* (2013.01); *G01B 2210/50* (2013.01)

(58) Field of Classification Search
CPC .............. G01B 11/026; G01B 11/0608; G01B 2210/50; G02B 13/18
(Continued)

(56) References Cited

U.S. PATENT DOCUMENTS

| | | | |
|---|---|---|---|
| 5,785,651 A | 7/1998 | Kuhn et al. | |
| 7,215,478 B1 * | 5/2007 | Hirata | G02B 21/33 359/656 |

(Continued)

FOREIGN PATENT DOCUMENTS

| | | |
|---|---|---|
| CN | 101238348 A | 8/2008 |
| CN | 102384721 A | 3/2012 |

(Continued)

OTHER PUBLICATIONS

"Non-contact <<point>> sensors," Stilsa Datasheet E1104, Jul. 15, 2011, 24 pages.

(Continued)

*Primary Examiner* — Isiaka O Akanbi
(74) *Attorney, Agent, or Firm* — Slater Matsil, LLP

(57) ABSTRACT

A device for contactless optical distance measurement includes a polychromatic light source, a light analysis unit and a measurement head. The measurement head has an aperture opening and an optical lens system, which has a chromatic longitudinal aberration. The optical lens system includes a first refractive lens element and a second refractive lens element. At least one of the refractive lens elements has at least one aspherical lens surface, and the first refractive lens element and/or the second refractive lens element has an optical material with an Abbe number $20 \leq V_d \leq 41$. The optical lens system has such a chromatic longitudinal aberration that a measurement region, which equals an axial (Continued)

focal shift of the optical lens system between the wavelengths of 450 nm and 700 nm, is between 0.2 mm inclusive and 10 mm inclusive.

16 Claims, 8 Drawing Sheets

(58) Field of Classification Search
USPC ........ 356/630, 614; 359/717, 782, 764, 682, 359/689
See application file for complete search history.

(56) References Cited

U.S. PATENT DOCUMENTS

| | | | |
|---|---|---|---|
| 7,561,273 | B2 | 7/2009 | Stautmeister et al. |
| 8,194,251 | B2 | 6/2012 | Emtman et al. |
| 8,212,997 | B1 | 7/2012 | Xie |
| 8,736,817 | B2* | 5/2014 | Jones .................. G01B 21/047 356/3.01 |
| 9,068,822 | B2* | 6/2015 | Sesko .................. G01B 11/007 |
| 2007/0046935 | A1 | 3/2007 | Lehmann et al. |
| 2007/0242279 | A1 | 10/2007 | Michelt et al. |
| 2008/0130013 | A1 | 6/2008 | Stautmeister et al. |
| 2008/0239278 | A1 | 10/2008 | Altendorf |
| 2009/0021750 | A1 | 1/2009 | Korner et al. |
| 2010/0145650 | A1* | 6/2010 | Nahum .............. G01B 11/0608 702/97 |
| 2010/0283989 | A1* | 11/2010 | Sesko ................ G01B 11/0608 356/4.04 |
| 2014/0347660 | A1* | 11/2014 | Rayer ................ G01B 11/026 356/300 |

FOREIGN PATENT DOCUMENTS

| | | |
|---|---|---|
| CN | 102650515 A | 8/2012 |
| CN | 102679880 A | 9/2012 |
| DE | 102004011189 A1 | 9/2005 |
| DE | 102006017400 A1 | 11/2007 |
| DE | 102006017400 B4 | 1/2010 |
| EP | 1975554 A1 | 10/2008 |
| EP | 2492632 A1 | 8/2012 |
| EP | 2500685 A1 | 9/2012 |
| FR | 2981160 A1 | 4/2013 |
| GB | 2497792 A | 6/2013 |
| JP | 2000275027 A | 10/2000 |
| JP | 2008256679 A | 10/2008 |
| JP | 2008541101 A | 11/2008 |
| JP | 2012173294 A | 9/2012 |
| WO | 2009153067 A8 | 3/2010 |

OTHER PUBLICATIONS

Hillenbrand, M. et al., "Chromatic Information Coding in Optical Systems for Hyperspectral Imaging and Chromatic Confocal Sensing," Proc. of SPIE, vol. 8550, Optical Systems Design, Dec. 18, 2012, pp. 85500D-1 to 85500D-10.

Jordan, H.-J., "Konfokale Punktsensoren (Confocal Point Sensors)", VDI Conference in Hannover, VDI-Berichte No. 1996, Oct. 9, 2007, pp. 123-129.

Miks, A. et al., "Theory of Hyperchromats With Linear Longitudinal Chromatic Aberation," Proc. of SPIE, vol. 5945, 14th Slovak-Czech-Polish Optical Conference on Wave and Quantum Aspects of Contemporary Optics, Aug. 15, 2005, pp. 59450Y-1 to 59450Y-6.

Mitschuanas, B. et al., "Hyperchromate-Theorie and Modellierung Einer Speziellen Hyperchromatischen Optik (Hyperchromats—Theory and Modeling of a Specific Hyperchromatic Optical System)," Technische Universität Ilmenau, DGaO Proceedings 2008, May 14, 2008, 1 page.

"Optolines, Journal for Photonic Solutions," Qioptiq Photonics for Innovation, Optolines No. 23, Q1 2010, pp. 1-20.

* cited by examiner ical system with chromatic aberration. Through
DEVICE FOR CONTACTLESS OPTICAL DISTANCE MEASUREMENT This patent application is a national phase filing under section 371 of PCT/EP2014/074348, filed Nov. 12, 2014, which claims the priority of German patent application 10 2013 113 265.0, filed Nov. 29, 2013, each of which is incorporated herein by reference in its entirety.

TECHNICAL FIELD

The invention relates to a device for contactless optical distance measurement.

BACKGROUND

A device for contactless optical distance measurement is, for example, described in Document DE 10 2006 017 400 A1 (U.S. counterpart application published as 2007/242279). The device has a measurement head with an imaging optical system with chromatic aberration. Through the optical system is imaged a light exit surface of a light source in wavelength-dependent focal planes and there generates a measurement spot of, for example, a few micrometers in diameter, in the region of which an object to be measured can be located. The light back-reflected by the object passes through the optical system in the reverse direction and is, for example, coupled into a fiber end, through which the light has entered the measurement head. A sharp image of the light exit surface of the light source, for example of a fiber end face, onto the object to be measured and vice versa ensues in each case on the basis of the chromatic aberration of the optical system only for a specific wavelength $\lambda$. In a spectral analysis of the reflecting light the wavelength $\lambda$ thus shows a sharp peak, from the wavelength of which the distance between the measurement head and the object to be measured can be determined via a calibration.

An optical distance sensor, which is based on this principle of the confocal imaging via a lens system with chromatic aberration, is known from Document US 2008/0239278 A1, for example.

The devices for contactless optical distance measurement known from prior art typically have at least three or four lenses, in order to generate a measurement region predetermined by the chromatic aberration of the lens system.

SUMMARY OF THE INVENTION

Embodiments of the invention provide an improved device for contactless optical distance measurement, which is in particular distinguished by a comparably simple and cost-effective design with advantageously small dimensions and furthermore by a high resolution and measurement accuracy.

According to at least one embodiment, the device for contactless optical distance measurement has a light source, a light analysis unit and a measurement head. The light source and the light analysis unit can, for example, be connected with the measurement head by an optical fiber. It is possible that the light source and the light analysis unit together form a control unit of the device and are, for example, integrated in a joint housing, which is connected with the measurement head via an optical fiber.

The light source of the device is a polychromatic light source, which is suitable for emitting light of a continuous spectrum into the measurement head. The light source is preferably a white light source, for example a white light LED, a halogen lamp or a xenon lamp. In order to achieve particularly compact dimensions, the use of a white light LED is particularly advantageous. The polychromatic light source can, for example, emit in the visible spectral range, which in particular includes the wavelength range of 450 nm to 700 nm.

The light analysis unit of the device is suitable for receiving and for spectrally analyzing light received from the measurement head. This allows the light reflected or scattered by an object to be measured in the measurement head to be spectrally analyzed, and therefore a distance to be measured of the object in the analyzed spectrum is determinable.

The measurement head has an aperture opening for the entry of light of the light source in the measurement head and for the exit of the received light, in particular the light reflected or scattered by an object to be measured, from the measurement head towards of the light analysis unit. The aperture opening thus serves both as light entry aperture and light exit aperture for the measurement head. The aperture opening is preferably circular and has a radius $r_{PH}$.

Furthermore, the measurement head has an optical lens system, which has a chromatic longitudinal aberration. In other words, the position of the focus on the optical axis of the lens system is dependent on the wavelength. The light of the light source entering the measurement head at the aperture opening constitutes a light spot, which is imaged by the optical lens system in a measurement spot, the axial position of which is dependent on the wavelength. As a polychromatic light source is used, the light spot of the aperture opening is imaged on the basis of the chromatic longitudinal aberration of the optical lens system in a region of measurement spots, which are differently positioned on the optical axis. In particular, the chromatic aberration causes the focus for shorter wavelengths to be located nearer to the optical lens system than for longer wavelengths.

The light back-reflected or back-scattered by an object is only then sharply imaged in the inverse optical path on the aperture opening of the measurement head if the object to be measured is in focus for a specific wavelength. In the spectral analysis of the light back-reflected or back-scattered into the aperture opening a maximum intensity is shown in the wavelength, in the focus of which the object is located. The distance of the object from the measurement head can thus be determined from the wavelength in which the maximum intensity occurs.

The measurement region of the measurement head is located between the focus, resulting for the shortest usable wavelength of the light source, and the focus, resulting for the longest usable wavelength of the light source. In order to achieve a large measurement region, it is thus advantageous to use a broadband light source and furthermore to use an optical lens system with a large chromatic aberration.

In the device described herein, the optical lens system of the measurement head advantageously consists of a first refractive lens and of a second refractive lens, wherein at least one of the refractive lenses has at least one aspherically curved lens surface. The aspherically curved lens surface can be convex or concavely curved. The remaining lens surfaces of the two refractive lenses are configured planar, spherically concave or spherically convex. Preferably, at least one of the refractive lenses has a planar lens surface, as this reduces the production effort and the tolerance sensitivity.

The first and/or the second refractive lens of the optical lens system advantageously have an optical material with an Abbe number $20 \leq v_d \leq 41$. The Abbe number is a measurement for the dispersion of an optical material. The larger the dispersion, i.e., the dependency of the refractive index on the wavelength, the smaller the Abbe number. As for the first and/or the second refractive lens an optical material with a comparatively small Abbe number $20 \leq v_d \leq 41$ is used, the optical lens system is advantageously distinguished by a high dispersion and thus by a high chromatic longitudinal aberration.

The optical lens system advantageously has such a chromatic longitudinal aberration that a measurement region, which equals an axial focus shift of the measurement head between the wavelengths 450 nm and 700 nm, is between 0.2 mm inclusively and 10 mm inclusively. In other words, in the optical lens system the focus for the wavelength 450 nm is at a distance of at least 0.2 mm and of maximum 10 mm from the focus for the wavelength 700 nm. The use of the visible spectral range between 450 nm and 700 nm is advantageous, as in addition to the availability of cost-effective light sources, optical materials with greater dispersion are also available. The definition of the measurement region as focus shift between the wavelengths 450 nm and 700 nm does not, however, rule out the possibility of the device being used at other wavelengths.

Due to the fact that the optical lens system of the measurement head consists of only two refractive lenses, the measurement head is advantageously simple in structure and, in comparison to optical lens systems with a larger number of lenses, is distinguished by a low weight and a short construction length. In the device described herein, the configuration of the optical lens system consisting of only two lenses is in particular allowed in that at least one of the two refractive lenses has at least one aspherically curved lens surface. By means of the at least one aspherically curved lens surface optical imaging errors, which would reduce the resolution and thus the measurement accuracy, can be better corrected than with the use of spherical lenses.

A challenge faced when designing the optical lens system of the measurement head is in particular, despite the desired high chromatic aberration of the lens system, is that of minimizing other relevant imaging errors, in particular the spherical aberration for various wavelengths, the so-called spherochromatism. It has emerged that a good correction of the spherochromatism for achieving a high measurement resolution can be achieved even in a lens system made of only two refractive lenses, if at least one of the lens surfaces of the refractive lenses is an aspherically curved lens surface. The aspherically curved lens surface preferably has a radially symmetrical curvature with relation to the optical axis.

A simulation program can be used for designing the optical lens system, in particular the radiuses of curvature of the spherical lenses, the shape of the aspherical lens surface, the distances between the lenses to one another, the aperture opening and the measurement region. Suitable simulation programs for designing optical systems are known per se to a person skilled in the art.

In a preferred embodiment of the optical lens system both the first and the second refractive lenses have an optical material with an Abbe number $20 \leq v_d \leq 41$. In this embodiment, both lenses of the optical lens system of the measurement head are advantageously configured of an optical material with a very high dispersion. This way, it is advantageously allowed for a particularly large chromatic aberration and thus a comparatively large measurement region can be achieved. Heavy-flint glasses are particularly suitable as optical material with high dispersion, the heavy-flint glasses typically having an Abbe number $v_d$ ranging between 20 and 30.

In a preferred embodiment of the device a product of the measurement region MR and the square of the numerical aperture $NA_{MR}$ of the optical lens system on the side of the measurement region is between 100 µm inclusively and 450 µm inclusively. 100 µm $\leq$ MR*$NA^2_{MR} \leq$ 450 µm thus applies. The measurement region MR equals, as previously described, in particular an axial focus shift of the lens system between the wavelengths 450 nm and 700 nm. The numerical aperture of the optical lens system on the side of the measurement region is $NA_{MR}$=n sin $\alpha_{MR}$, wherein n is the refractive index of the ambient medium in the measurement region, which equals approx. 1 in the air. The angle $\alpha_{MR}$ is the angle between the optical axis and an edge ray of the light bundle that, starting in the measurement region, for example, after reflection on the object to be measured, encounters the second lens of the optical lens system. It could be shown that with increasing numerical aperture $NA_{MR}$ on the side of the measurement region the resolution capability improves. The indicated preferred value range 100 µm $\leq$ MR*$NA^2_{MR} \leq$ 450 µm describes a range in which a good compromise exists between the size of the measurement region and the system resolution depending on the numerical aperture. A large measurement region can, for example, be achieved by using a lens system with very long focal length, which, however, also reduces the numerical aperture and thus the resolution capability. Thus, in the optical design of the lens system a compromise is preferably selected between the size of the measurement region and the numerical aperture, which is expressed in the specified value range for the product $NA^2_{MR}$*MR. In the specified value range are advantageously achieved both a high resolution and comparatively large measurement region.

In a further advantageous embodiment of the device a product of the radius $r_{PH}$ of the aperture opening and of the numerical aperture $NA_{PH}$ on the side of the aperture opening is between 1.0 µm inclusively and 5.5 µm inclusively. 1.0 µm $\leq r_{PH}$*$NA_{PH} \leq$ 5.5 µm thus applies. The numerical aperture on the side of the aperture opening is $NA_{PH}$=n sin $\alpha_{PH}$, wherein n is the refractive index of the ambient medium, which equals approx. 1 in air. The angle $\alpha_{PH}$ is the angle between the optical axis and an edge ray of the light bundle that, starting in the measurement region encounters the first lens of the optical lens system. The term numerical aperture is to be understood here and in the following as the effective numerical aperture, which takes into account the fact that the angle $\alpha_{PH}$ of the edge ray is not just limitable by the opening angle of the light bundle exiting from the aperture opening, but possibly also by one or more subsequent apertures or by one of the diameter lenses.

The product $r_{PH}$*$NA_{PH}$ is designated here and in the following as beam parameter product. A large beam parameter product, i.e., a comparatively large aperture opening $r_{PH}$ and a large numerical aperture $NA_{PH}$, is advantageous when a large signal to noise ratio is intended to be achieved, as in such case a high light output is available. Conversely, it has emerged that the resolution decreases in the event of increasing beam parameter product $r_{PH}$*$NA_{PH}$, which is shown by enlarged spectral peak widths in the analysis of the light reflected by the object to be measured. Contrary to the numerical aperture $NA_{MR}$ on the side of the measurement region, which should be as large as possible for achieving a high resolution, a small numerical aperture $NA_{PH}$ and a smaller aperture radius $r_{PH}$ on the side of the aperture opening is thus advantageous for the resolution. In the specified preferred value range for the beam parameter product $r_{PH}*NA_{PH}$ a good compromise is achieved between the light transmission of the system and resulting measurement time and the resolution and the resulting measurement accuracy. Values of the beam parameter product in the range of the lower limit 1.0 µm are suitable for high-resolution measurements with greater measurement time, whereas values in the range of the upper limit 5.5 µm are suitable for comparatively rapid measurements with somewhat lower resolution.

In a preferred configuration of the device the light source and the light analysis unit are connected with the measurement head via an optical fiber. In particular the light emitted by the light source can be conducted to the measurement head via the optical fiber, and the light reflected by the object in the reverse beam direction can be led towards the light analysis unit by the same optical fiber. The back-reflected light can, for example, be conducted to the light analysis unit after passing through the optical fiber by means of a beam splitter. The connection of the light source and of the light analysis unit by means of a flexible optical fiber advantageously enables the measurement head, which is distinguished in the device described herein by minimal dimensions and low weight, to be positioned in a space-saving manner in the proximity of the object to be measured. The light source and the light analysis unit are located in such case in the region of the opposing end of the optical fiber. Used as optical fiber is preferably an optical fiber with a fiber core diameter of 9 µm to 50 µm and an effective numerical aperture $NA_{PH}$ of 0.07 to 0.22. The effective numerical aperture can be limited by the optical fiber, by the diameter of the lenses, or possibly by one or more subsequent apertures.

When the light source and the light analysis unit are connected with the measurement head by means of an optical fiber, the aperture opening of the measurement heads can be a fiber end face of the optical fiber. In such case, the radius $r_{PH}$ of the aperture opening equals the radius of the optical fiber.

In one embodiment an optical element is arranged on a fiber end face facing the optical lens system. The optical element is advantageously firmly connected with the fiber end face and can in particular be cemented with the fiber end face or pressed onto such. The optical element preferably has a refractive index, which is adjusted to the refractive index of the fibers, and therefore any back-reflection of light onto the fiber end face is reduced.

The optical element connected with the fiber end face can have various embodiments. In one embodiment the optical element is an optical window. Such optical window in this context is in particular understood to be an element made of a transparent material, which has no lens function and, for example, is designed in a planar manner on an end surface facing the optical lens system.

In further advantageous embodiments the optical element has a lens function. For example, the optical element is a refractive divergent lens. In this case, an end surface of the optical element facing the optical lens system is, for example, configured concavely. The refractive divergent lens allows the divergence of the light cone exiting from the optical fiber to be advantageously enlarged. This advantageously enables a shorter structural shape of the measurement head.

In a further advantageous embodiment the optical element is a gradient-index divergent lens. The gradient-index divergent lens serves, similarly to the previously described refractive divergent lens, advantageously for enlarging the divergence of the light bundle exiting from the optical fiber with the advantage of a curtailment of the construction length of the measurement head. The gradient-index lens can in particular have a radial refractive index profile in which the refractive index on the optical axis is minimal and increases towards the outside. The radial refractive index profile can in particular be almost parabolic. "Almost parabolic" in this context can mean that the radial gradient of the refractive index can be described as polynomial function, which has at least one summand dependent on the square of the radial distance from the optical axis, wherein the polynomial function can also include further summands for correcting imaging errors. The gradient-index lens advantageously has a planar optical end surface and can be produced cost-effectively in large quantities.

In a further advantageous embodiment the optical element is a gradient-index converging lens. Such a gradient-index converging lens preferably has a radial refractive index profile, in which the refractive index on the optical axis is maximal and decreases on towards the outside. The radial refractive index profile can in particular be almost parabolic. As the previously described gradient-index divergent lens, the gradient-index converging lens advantageously has a planar optical end surface and can be produced cost-effectively in large quantities. The gradient-index converging lens can be used for enlarging the divergence of the light bundle exiting the optical fiber, in that the beam is focused in a focal point, which is still located within or close to the gradient-index converging lens, and therefore the beam behind the focal point diverges again.

In a further advantageous embodiment the optical element is a gradient-index lens, which images the light spot of the light source formed by the fiber end face in one or more intermediate images. In this embodiment the gradient-index lens advantageously is a gradient-index converging lens, which has a radial, preferably almost parabolic, refractive index profile with maximal refractive index on the optical axis. Such a radial refractive index profile generates a continuous, cosinusoidal beam path within the gradient-index converging lens, the period of which is designated here and in the following as pitch length.

A gradient-index converging lens, with a length equalling a pitch length, images the light entry surface on the correct side of the exit surface. In the event of a length equalling half a pitch length, an inverted image is created. A gradient-index converging lens, with a length greater than half a pitch length, thus generates at least an intermediate image of the entry surface. In the embodiment described here the gradient-index lens has a length greater or equalling half a pitch length, preferably greater or equal to a pitch length, and therefore the light entry surface is preferably imaged in one or preferably more intermediate images. On the basis of the typical dependence of the pitch length of a gradient-index lens on the wavelength, by which the pitch length increases with growing wavelength, a chromatic focus shift already occurs in the one or more intermediate images, the chromatic focus shift reinforcing the entire chromatic aberration of the measurement head and thereby advantageously generating an enlarged measurement region.

In the previously described advantageous embodiments, in which an optical element is arranged on one of the fiber end faces facing the optical lens system in each case, an end surface of the optical elements facing the optical lens system of the measurement head is preferably provided with a reflection-reducing coating. This advantageously reduces reflection losses when decoupling the light of the light source from the optical element and when coupling the back-reflected light into the optical element.

In a further advantageous embodiment a distance element is arranged between the fiber end face of the optical fiber and the optical element. In this embodiment the optical element thus is not immediately adjacent to the fiber end face, but is instead spaced by the distance element, for example an optical window, from the fiber end face.

In a further advantageous embodiment the fiber end face of the optical fiber and a surface of the optical element or of the distance element facing the fiber end face are designed obliquely with relation to the optical axis. This allows any back-reflection of light at the boundary surface between the fiber end face and the optical element or the distance element to be advantageously further reduced.

In a further advantageous embodiment a beam deflector element is arranged in the measurement head. This embodiment is then advantageous when the light is intended to exit from the measurement head in a lateral direction towards the object to be measured. This is then expedient, for example, if cavities or objects in flat intermediate spaces are to be measured. The beam deflector element can, for example, be a prism or a mirror. In particular a beam deflection by 90° can be provided. The beam deflector element can be arranged downstream from the optical lens system in the beam direction, between the two refractive lenses, or between the aperture opening and the optical lens system.

BRIEF DESCRIPTION OF THE DRAWINGS

The invention is explained in more detail in the following on the basis of exemplary embodiments in conjunction with FIGS. 1 to 11.

The figures show in.

Identical or identically functioning components are always indicated with identical reference numerals in the illustrations. The components shown as well as the size ratios of the components amongst each other should not be considered as true-to-scale.

DETAILED DESCRIPTION OF ILLUSTRATIVE EMBODIMENTS

Figure 1:
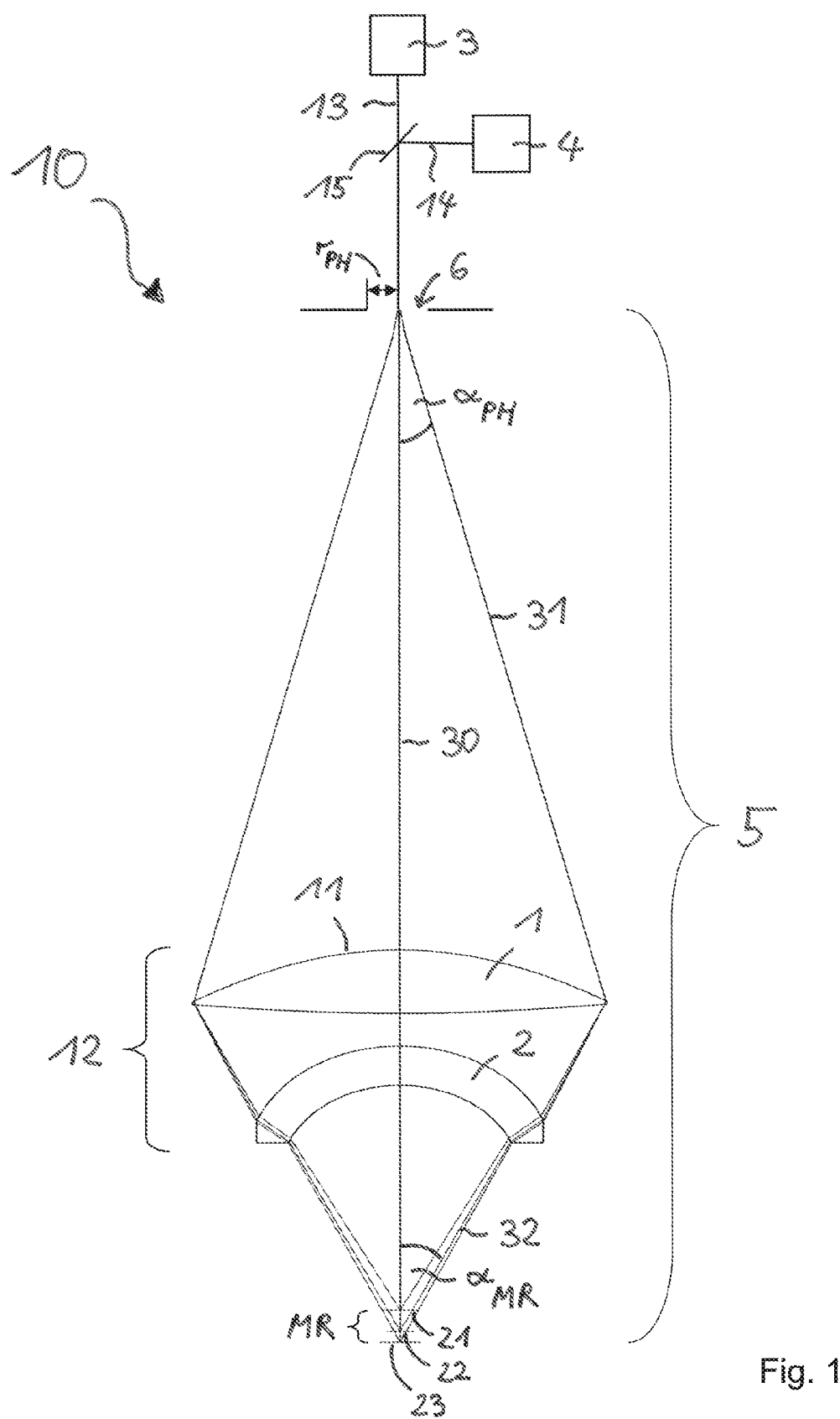
FIG. 1: a schematic diagram of a cross-section through a device for contactless optical dimensional measurement of an object according to an exemplary embodiment.

The device 10 for contactless optical dimensional measuring of an object schematically shown in FIG. 1 according to an exemplary embodiment contains a light source 3, a light analysis unit 4 and a measurement head 5.

The light source 3 emits polychromatic light 13, i.e., light 13 with a continuous spectrum that enters the measurement head 5 through an aperture opening 6. The light source 3 is preferably a white light source, for example a white light emitting LED, a halogen lamp or a xenon lamp. The aperture opening 6 is preferably a circular opening with a radius $r_{PH}$. The aperture opening 6 can, for example, be a pinhole aperture or the fiber end face of an optical fiber.

The measurement head 5 of the device 10 has an optical lens system 12, consisting of a first refractive lens 1 and a second refractive lens 2. The optical lens system 12 has a chromatic longitudinal aberration, such that a light spot formed by the aperture opening 6 of the polychromatic light source 3 is imaged in various focal planes 21, 22, 23. Light with a shorter wavelength is imaged in a focal plane 21, which is located closer to the optical lens system 12 on the optical axis than a focal plane 23 for light with a longer wavelength. The wavelength range between 450 nm and 700 nm can, for example, be provided for the measurement. In such case, for example, the light with the shortest wavelength 450 nm is focused in a focal plane 21 and the light with the longest wavelength 700 nm is focused in a focal plane 23 further away from the lens system 12. The focus shift, which the optical lens system 12 generates on the basis of the chromatic aberration between the shortest and longest wavelength used defines a measurement region MR, in which an object to be measured can be measured.

When an object to be measured is positioned in the measurement region MR, part of the radiated light is back-reflected or scattered to the optical lens system 12. Light of the same wavelength, in the focal plane of which the object to be measured is located, is focused by the optical lens system 12 in the reverse beam direction onto the aperture opening 6, whereas light of other wavelengths are not sharply imaged on the aperture opening 6 and thus suffers high losses. The light back-reflected in the reverse beam direction through the aperture opening 6 can, for example, be supplied to the light analysis unit 4 via a beam splitter 15. The light analysis unit 4 is, for example, a spectrometer, in which the measurement light 14 is spectrally analyzed.

In the spectrum of the measurement light 14 for the wavelength, in the focal plane of which the object to be measured is located, a sharp maximum occurs, from the position of which the distance of the object to be measured can be determined by corresponding calibration. Distance measurements at various positions of an object, in particular in a two-dimensional grid, allow a height profile of the object to be determined. Furthermore, the measuring system offers the option of determining the thickness of thin transparent layers with high precision, in which a back-reflection to a frontal and rear border surface ensues, and therefore two maximum intensities occur for various wavelengths in the measuring light 14, from the difference of which the thickness can be determined.

The measuring principle of the device avails itself of the chromatic longitudinal aberration of the optical lens systems 12. However, in order to achieve a high measurement resolution, it is of essential importance, to reduce other optical imaging errors, in particular the spherochromatism, as much as possible. In the device described herein this is achieved by an optical lens system 12 that consists of only two refractive lenses 1, 2. Despite the use of only two lenses 1, 2 optical imaging errors are in particular reduced by the fact that at least one of the lenses 1, 2 has at least one aspherical lens surface 11. In the exemplary embodiment in FIG. 1 the lens surface of the first refractive lens 1 facing the aperture opening 6 is an aspherical lens surface 11. In other embodiments of the optical lens systems 12, at least one of the other lens surfaces can alternatively or additionally be configured as an aspherical lens surface.

In the first approximation the optical lens system 12 can be described as being composed of two thin lenses. The chromatic longitudinal splitting (measurement region MR) with averaged edge beam heights $y_1$ and $y_2$ at the two lenses 1, 2 with focal lengths $f_1$, $f_2$ and the Abbe numbers $v_1$, $v_2$ then is given by $$MR = \frac{1}{NA_{MR}} \cdot \left( \frac{y_1^2}{v_1 f_1} + \frac{y_2^2}{v_2 f_2} \right).$$

It has proved to be advantageous to design a lens surface of that lens of the two lenses 1, 2 of the optical lens system 12 which has the shorter focal length in an aspherical manner. This allows a low tolerance sensitivity to be achieved. Furthermore, it is advantageous when, in the event of lenses 1, 2 with different focal lengths $f_1$, $f_2$ and different Abbe numbers $v_1$, $v_1$, the lens with the shorter focal length has the lower Abbe number, in particular an Abbe number between 20 and 30.

In order to achieve a construction length as short as possible, at least one of the lenses 1, 2 can be designed as a meniscus lens. In such case, the first lens 1 is preferably designed concave towards the aperture opening 6 or the second lens 2 concave towards the measuring space.

In a further advantageous embodiment the second lens 2 has the aspherical lens surface 11 and a smaller focal length than the first lens. In particular the ratio of the focal lengths can approximately equal the ratio of the numerical aperture $NA_{PH}$ on the side of the aperture opening with relation to the numerical aperture $NA_{MR}$ on the side of the measuring space.

The aspherical lens surface 11 preferably has a radially symmetrical height profile h(r), which can, for example, be shown by the following equation:

$$h(r) = \frac{r^2}{R\left(1 + \sqrt{1 - (1+k)\frac{r^2}{R^2}}\right)} + \sum_{i=1}^{n} A_{2i} r^{2i}$$

Here, h (r) is a height coordinate as function of the radial distance r perpendicular to the optical axis, R the apex radius, k the conical constant and $A_{2i}$ the aspherical parameters.

The design of the aspherical lens surface 11, i.e., the determination of the parameters of the equation, preferably ensues via a simulation calculation, which involves the entire optical system.

The use of only two lenses 1, 2 in the measurement head 5 has in particular the advantage that the measurement head 5 is distinguished by comparatively small dimensions and a low weight. In order to achieve as large a chromatic aberration as possible, despite the use of only two lenses 1, 2 with the optical lens system 12, at least one of the lenses 1, 2 is made of an optical material having an Abbe number $v_d$ between 20 and 41. An optical material with such a low Abbe number $v_d$ is distinguished by a strong optical dispersion, i.e., the refractive index is strongly dependent on the wavelength. Particularly preferably both lenses 1, 2 of the optical lens systems 12 are made of strongly dispersive optical materials with Abbe numbers $v_d$ between 20 and 41. Such optical materials are in particular heavy-flint glasses. Suitable glasses are, for example, available under the designations SF66 ($v_d$=20.88), LaSF$_{35}$ ($v_d$=29.06), N—LaSF$_{43}$ ($v_d$=40.61) and BaSF13 ($v_d$=38.57) of the Schott Company.

The optical lens system 12 in the device 10 has such a chromatic longitudinal aberration that an axial focus shift occurs between the wavelengths 450 nm and 700 nm, the axial focus shift defining a measurement region MR between 0.2 mm and 10 mm.

The optical lens system 12 has a numerical aperture $NA_{PH}$=n sin $\alpha_{PH}$ on the side of the aperture opening 6. The angle $\alpha_{PH}$ is thereby an angle between the optical axis 30 and an edge ray 31 of the light bundle that encounters the optical lens system 12 when exiting the aperture opening 6. A further characteristic parameter of the optical lens system 12 is the numerical aperture $NA_{MR}$=n sin $\alpha_{MR}$ on the side of the measurement region MR. The angle $\alpha_{MR}$ is thereby the angle between the optical axis 30 and an edge ray 32 of the light bundle that encounters the optical lens system 12 when exiting the measurement region. The refractive index n is typically the refractive index of air and thus approximately equal to 1.

The following conditions are preferably simultaneously fulfilled in the device:

100 µm≤MR*$NA^2_{MR}$≤450 µm 1.0 µm≤$r_{PH}$*$NA_{PH}$≤5.5 µm

It has particularly emerged in extensive case studies that a high resolution can be achieved in such value ranges. It can be derived from the theory of confocal imaging that, in the given measurement region MR, a high resolution of the measurement head, which is expressed in as small as possible spectral peak width of the measurement signal, can only be achieved when a specific numerical aperture $NA_{MR}$ is not exceeded in the measuring space. The condition (1) specifies a particularly preferred region for the product MR*$NA^2_{MR}$. However, the peak width of the measuring signal is also dependent on the beam parameter product $r_{PH}$*$NA_{PH}$. The condition (2) specifies a particularly preferred range for this parameter.

The following FIGS. 2A to 2J show exemplary embodiments for optical lens systems, which simultaneously fulfil the named conditions (1) and (2). The optical lens system in particular have such a good correction of optical imaging errors that the peak widths of the measuring signal are essentially only dependent on unavoidable diffractive effects at the aperture opening. In other words, a diffraction-limited image is achieved. The aspherical lens surface is identified by the reference numeral 11 in each case.

The optical lens systems are in particular identified by the following parameters:

$f_1$: partial focal length of the first lens
$f_2$: partial focal length of the second lens
$v_{d1}$: Abbe number of the first lens
$v_{d2}$: Abbe number of the second lens
L: construction length of the measurement head
d: diameter of the measurement head.

Figure 2A:
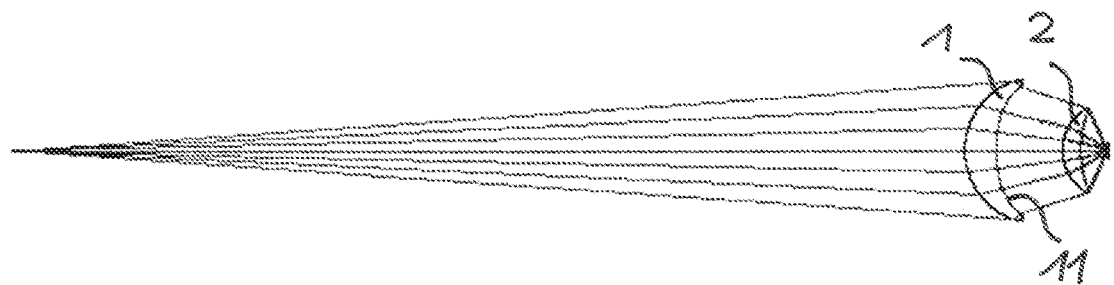
FIG. 2A to 2J: a cross-section through the optical lens system of the measurement head in various embodiments in each case
Figure 2B:
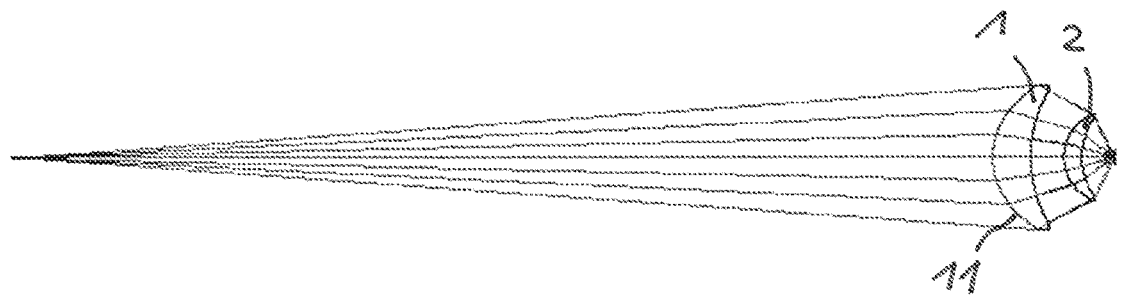
Figure 2C:
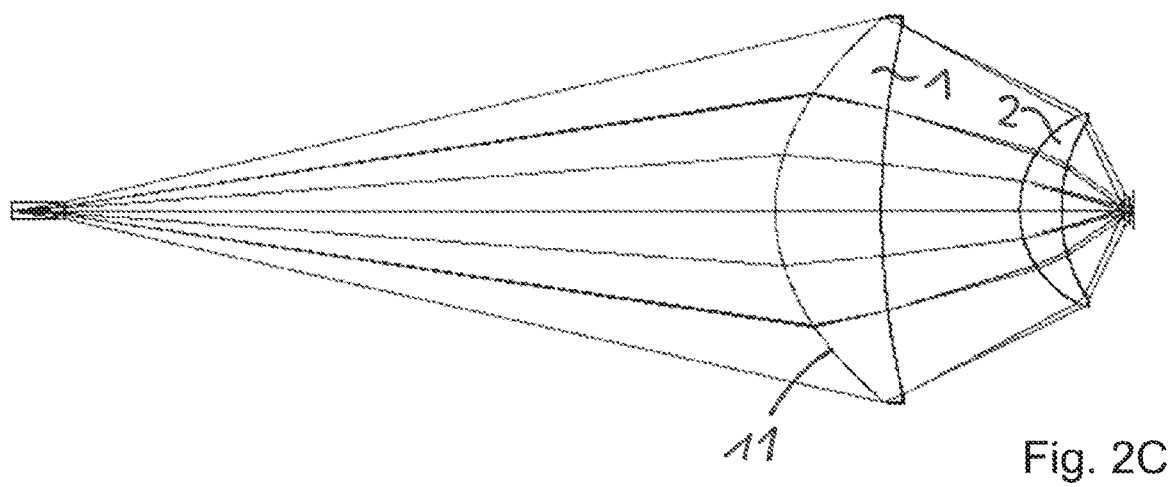

Each of the exemplary embodiments in the FIGS. 2A to 2C have a measurement region MR=0.25 mm.

In the exemplary embodiment in FIG. 2A is $NA_{MR}$=0.91, MR*$NA^2_{MR}$=210 µm, $NA_{PH}$=0.07, $r_{PH}$=14 µm, $r_{PH}$*$NA_{PH}$=1 µm, $f_1$=12.7 mm, $f_2$=6.0 mm, $v_{d1}$=28.4, $v_{d2}$=29.1, L=89.1 mm and D=11.6 mm.

In the exemplary embodiment in FIG. 2B is $NA_{MR}$=0.91, MR*$NA^2_{MR}$=210 µm, $NA_{PH}$=0.07, $r_{PH}$=14 µm, $r_{PH}$*$NA_{PH}$=1 µm, $f_1$=11.3 mm, $f_2$=7.6 mm, $v_{d1}$=28.4, $v_{d2}$=29.1, L=85.3 mm and D=11.4 mm.

In the exemplary embodiment in FIG. 2C is $NA_{MR}$=0.91, MR*$NA^2_{Mr}$=210 µm, $NA_{PH}$=0.22, $r_{PH}$=25 µm, $r_{PH}$*$NA_{PH}$=5.5 µm, $f_1$=7.5 mm, $f_2$=5.8 mm, $v_{d1}$=28.4, $v_{d2}$=29.1, L=30.0 mm and D=11.0 mm.

Each of the exemplary embodiments in FIG. 2D to 2G have a measurement region of approximately MR=1.5 mm.

Figure 2D:
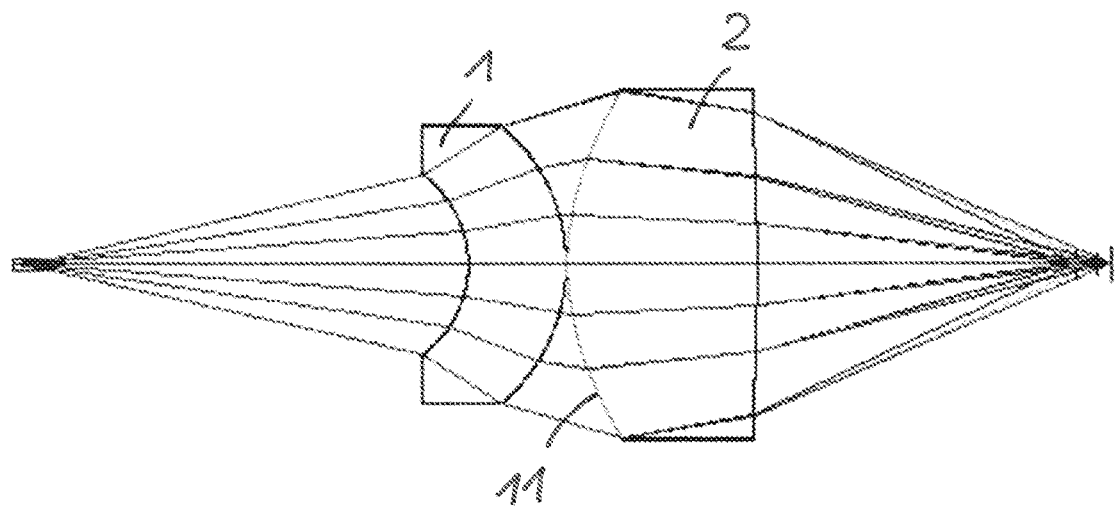

In the exemplary embodiment in FIG. 2D is $NA_{MR}$=0.40, MR*$NA^2_{MR}$=240 µm, $NA_{PH}$=0.22, $r_{PH}$=13 µm, $r_{PH}*NA_{PH}=2.9$ μm, $f_1=-39$ mm, $f_2=9.6$ mm, $v_{d1}=28.4$, $v_{d2}=29.1$, L=41.5 mm and D=14.0 mm.

Figure 2E:
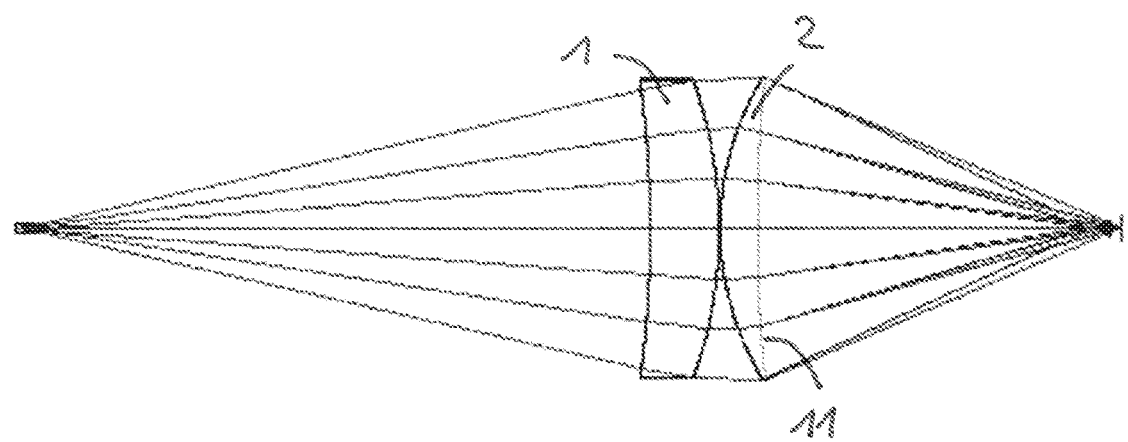

In the exemplary embodiment in FIG. 2E is $NA_{MR}=0.40$, $MR*NA^2_{MR}=240$ μm, $NA_{PH}=0.22$, $r_{PH}=13$ μm, $r_{PH}*NA_{PH}=2.9$ μm, $f_1=44.4$ mm, $f_2=17.0$ mm, $v_{d1}=28.4$, $v_{d2}=29.1$, L=54 mm and D=15.5 mm.

Figure 2F:
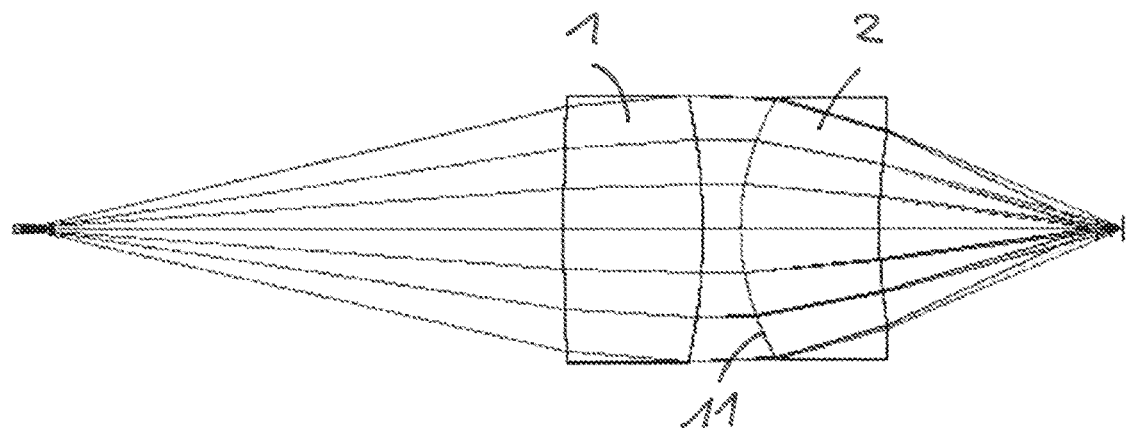

In the exemplary embodiment in FIG. 2F is $NA_{MR}=0.40$, $R*NA^2_{MR}=240$ μm, $NA_{PH}=0.22$, $r_{PH}=13$ μm, $r_{PH}*NA_{PH}=2.9$ μm, $f_1=30.0$ mm, $f_{2=18.8}$ mm, $v_{d1}=20.0$, $v_{d2}=29.1$, L=57.9 mm and D=14.4 mm.

Figure 2G:
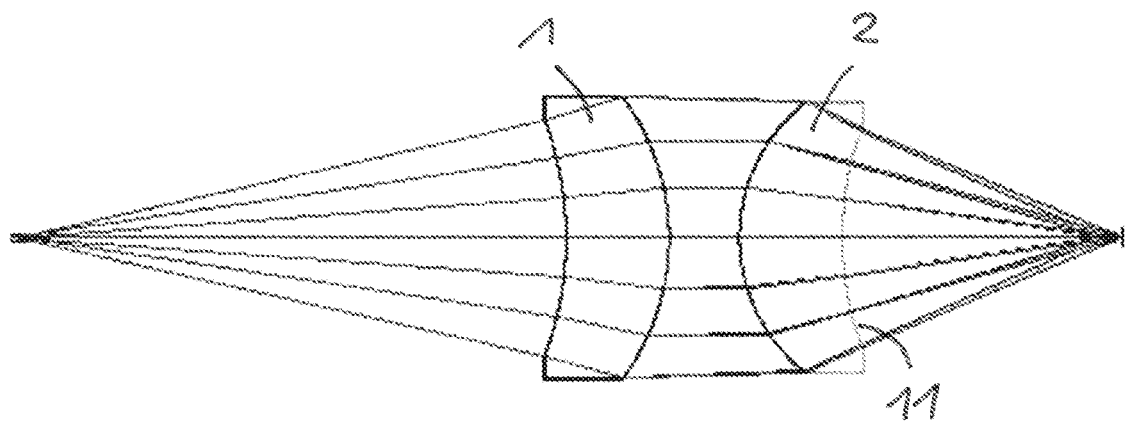

In the exemplary embodiment in FIG. 2G is $NA_{MR}=0.40$, $MR*NA^2_{MR}=240$ μm, $NA_{PH}=0.22$, $r_{PH}=13$ μm, $r_{PH}*NA_{PH}=2.9$ μm, $f_1=50.9$ mm, $f_2=25.8$ mm, $v_{d1}=40.6$, $v_{d2}=38.6$, L=79.0 mm and D=21.0 mm.

Figure 2H:
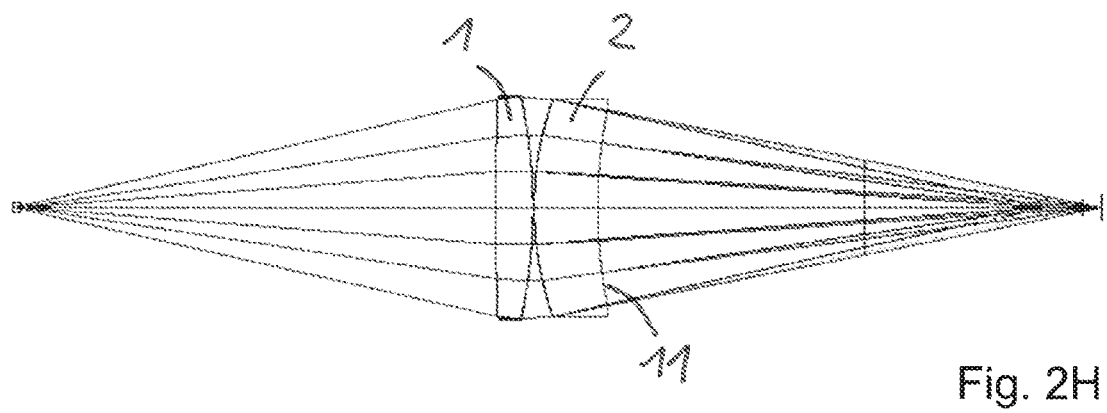
Figure 2I:
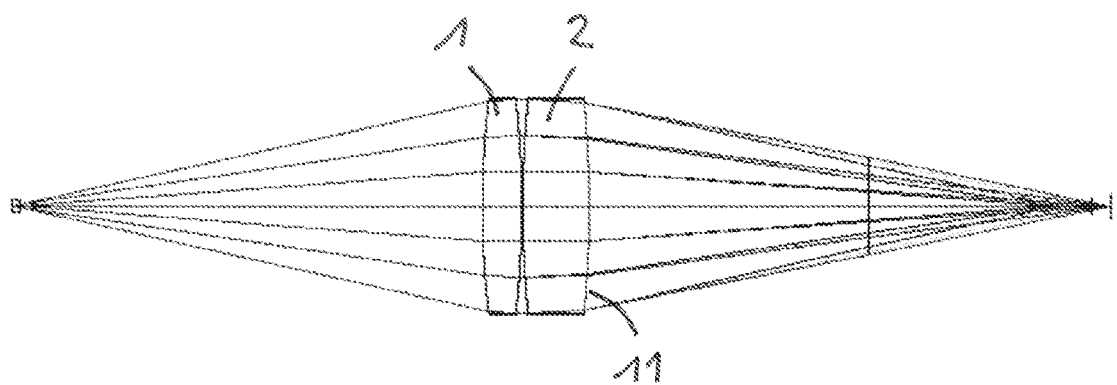

Each of the exemplary embodiments in FIGS. 2H and 2I have a measurement region MR=10 mm.

In the exemplary embodiment in FIG. 2H is $NA_{MR}=0.205$, $MR*NA^2_{MR}=420$ μm, $NA_{PH}=0.22$, $r_{PH}=13$ μm, $r_{PH}*NA_{PH}=2.9$ μm, $f_1=78.5$ mm, $f_2=130$ mm, $v_{d1}=29.1$, $v_{d2}=29.1$, L=199 mm and D=41.8 mm.

In the exemplary embodiment in FIG. 2I is $NA_{MR}=0.205$, $MR*NA^2_{MR}=420$ μm, $NA_{PH}=0.22$, $r_{PH}=13$ μm, $r_{PH}*NA_{PH}=2.9$ μm, $f_1=87.0$ mm, $f_2=91.4$ mm, $v_{d1}=29.1$, $v_{d2}=29.1$, L=193 mm and D=39.0 mm.

Figure 2J:
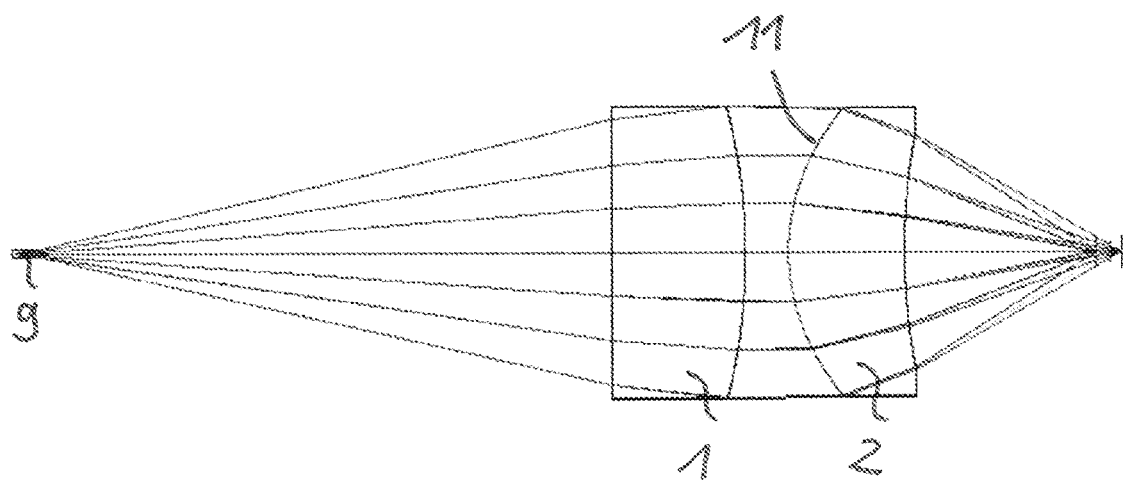

FIG. 2J shows a further exemplary embodiment, on the basis of which the design of the optical system, in particular of the refractive lenses 1, 2 and the aspherical lens surface 11 is explained in detail. The lens system has been calculated for a measurement region MR=1.5 mm. In the exemplary embodiment is $NA_{MR}=0.51$, $NA_{PH}=0.22$, $MR*NA^2_{MR}=390$ μM, L=60.5 mm and D=16.6 mm.

A distance element 9 made of glass of type BK7 planar on both sides with a thickness of 1.5 mm follows on the aperture opening. That is then followed, after an air gap of 31.6395 mm, by the first lens 1, which is configured as spherical plano-convex lens made of glass of type SF66 ($v_{d1}=21$). The side of the lens 1 facing the aperture opening is planar. Using at least one planar lens surface advantageously reduces the production effort and the tolerance sensitivity. The opposing spherically convex surface has a radius of curvature of 33.6943 mm. The center thickness of the lens 1 equals 7.500 mm.

The first lens is followed, after an air gap of 2.418 mm, by the second lens 2, which is configured as aspherical meniscus lens made of glass of type SF66 ($v_{d2}=21$). The lens surface facing the first lens 1 has a radially symmetrical height profile h(r) with (referring to the formula mentioned above) an apex radius R=11.36687 mm, a conical constant k=-0.224302 as well as aspherical parameters $A_2=-2.260*10^{-8}$, $A_4=-1.384*10^{-5}$, $A_6=-7.777*10^{-8}$, $A_8=-3.609*10^{-10}$, $A_{10}=-1.365*10^{-12}$ and $A_{12}=-2.501*10^{-14}$. The center thickness of the lens 2 equals 5.0889 mm. The lens surface of the second lens facing the measurement region is spherically concave with a radius of curvature 38.0431 mm.

Starting from the second lens 2 the focus for the wavelength λ=450 nm lies in a distance in air of 11.541 mm, for the wavelength λ=546 nm in a distance in air of 12.395 mm and for the wavelength λ=675 nm in a distance in air of 12.991 mm.

Figure 3:
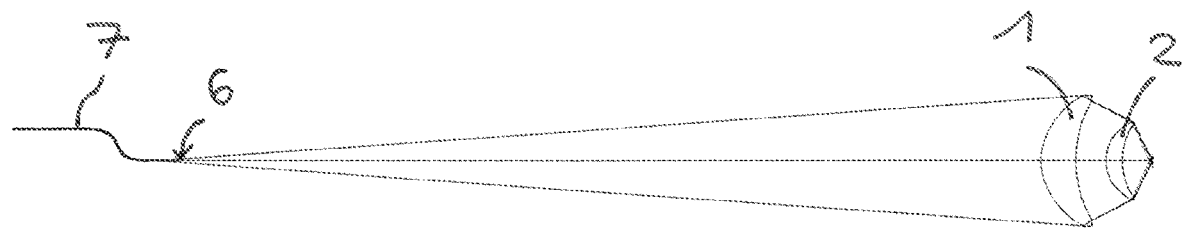
FIG. 3 to 11: a schematic diagram of the measurement head in various embodiments in each case.

When applying the measurement principle, it is favorable to spatially separate the optical measurement head from an evaluation unit, which comprises the polychromatic light source and the light analysis unit, by a flexible optical fiber 7, as shown in FIG. 3. As a result, the measurement head takes up little space, has a low weight and can also be used under critical conditions, such as in vacuum or in environments with strong electromagnetic disturbances. The front surface of the optical fiber 7 in this configuration serves as aperture opening 6 of the measurement head and thus constitutes the light exit and entry aperture. A fiber with a core diameter of between 9 μm and 50 μm and a numerical aperture between 0.07 and 0.22 is preferably used as optical fiber 7.

The lower the beam parameter product $r_{PH}*NA_{PH}$ of the radius $r_{PH}$ of the optical fiber and of the numerical aperture $NA_{PH}$ on the side of the optical fiber 7, the more confocal is the imaging of the measurement head 5 and the higher the resolution of detectable distances. However, for short sampling rates, it is favorable if as much light of the light source as possible is coupled into the optical fiber 7, and therefore a greater beam parameter product $r_{PH}*NA_{PH}$ is advantageous. In such case, a multimode fiber, in particular, for example, a graded-index fiber with 50 μm diameter with $NA_{PH}=0.22$ can be used. The relatively high beam parameter product $r_{PH}*NA_{PH}$ of the optical fiber 7 can, if necessary, be perceptibly decreased by reducing the effective numerical aperture $NA_{PH}$ by screening off in the measurement head, preferably via the lens diameter, to values of up to 0.07. In the exemplary embodiment of FIG. 3 is $NA_{PH}=0.07$ and $NA_{MR}=0.90$, wherein a focus shift of 0.25 mm occurs between the wavelengths 450 nm and 675 nm.

Figure 4:
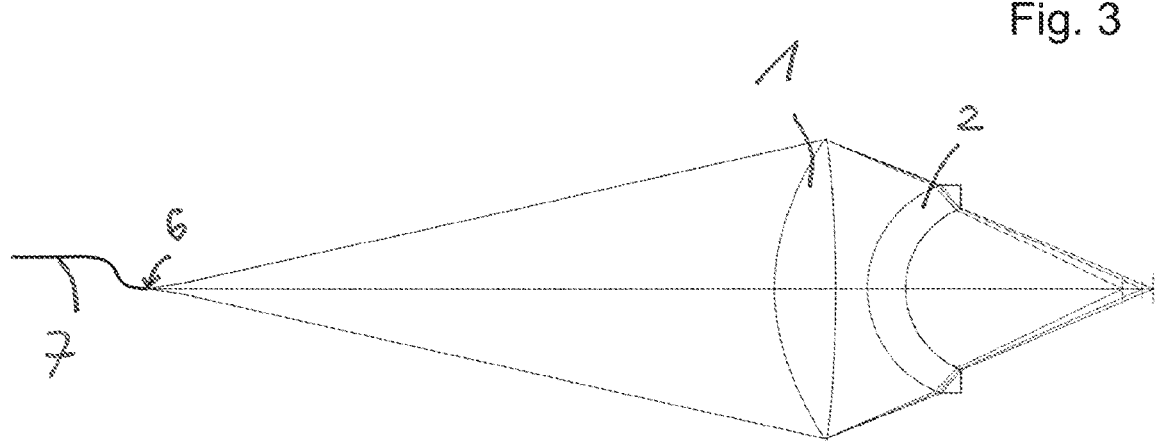

A shorter design can be achieved by a larger (effective) numerical aperture $NA_{PH}$ on the side of the optical fiber 7, wherein the beam parameter product $r_{PH}*NA_{PH}$ can be adjusted by the radius $r_{PH}$ of the optical fiber 7. FIG. 4 shows an embodiment of an optical measurement head, in which the effective numerical aperture on the side of the optical fiber 7 $NA_{PH}=0.22$ and the numerical aperture on the side of the measurement region $NA_{MR}=0.4$. In this embodiment a chromatic focus shift of 1.5 mm is achieved in the wavelength range between 450 and 675 nm.

Figure 5:
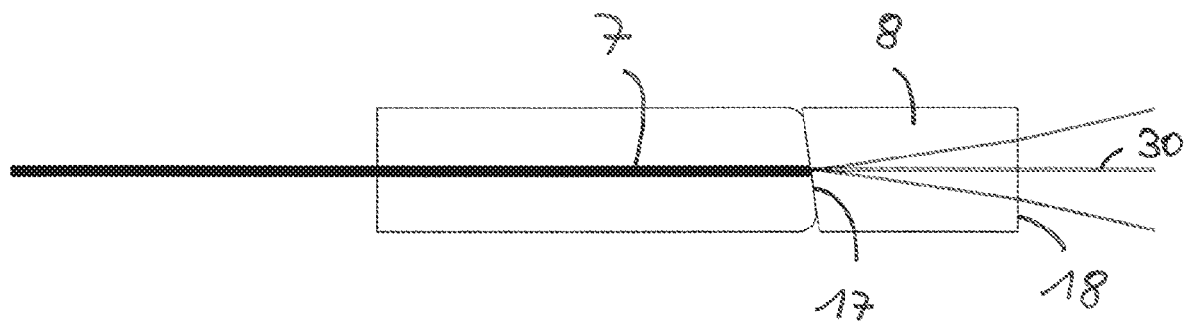

Many measurement objects, such as liquids, transparent media (glasses, plastics) or bloomed optical surfaces, have a lower reflectivity for the measuring light, and therefore it is essential to suppress intrinsic retroreflections in the measurement system as much as possible. In the exemplary embodiment in FIG. 5 an optical window 8 is used to this end, the refraction index of which is advantageously adjusted to a refraction index of the optical fiber 7. The optical window 8 is attached to a fiber end face 17 of the optical fiber 7, for instance by cementing or press-fitting as in optical fiber couplings. This reduces the retroreflections (Fresnel reflection) on the fiber end face 17. The end surface 18 of the optical window 8 facing the optical lens system can be provided with a reflection-reducing coating (not shown), although the influence thereof is perceptibly lower due to the distance to the fiber end face 17. When a particularly strong suppression of retroreflection is to be achieved, or a vulnerability to contaminations in the event of detachable fiber plug connections should be avoided, it is advantageous to design the fiber end face 17 and a surface of the optical element 8 facing the fiber end face obliquely in relation to the optical axis 30, as shown in FIG. 5. This is achieved by an oblique polishing of the end surfaces.

Figure 6:
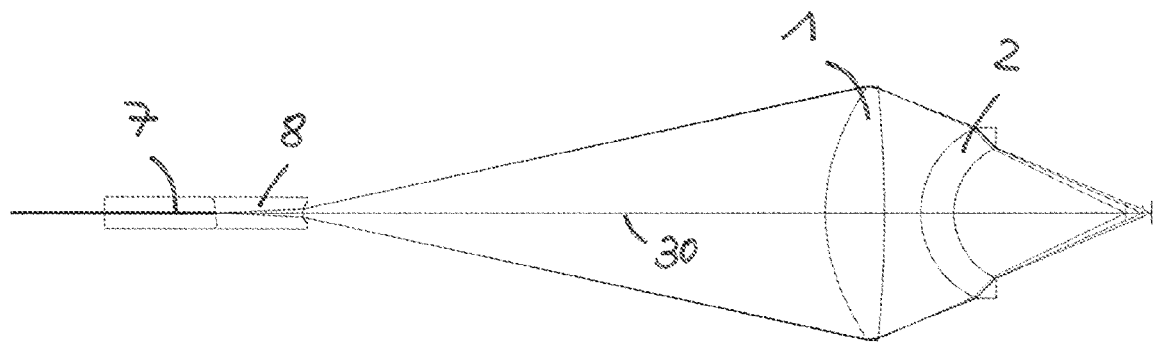
Figure 7:
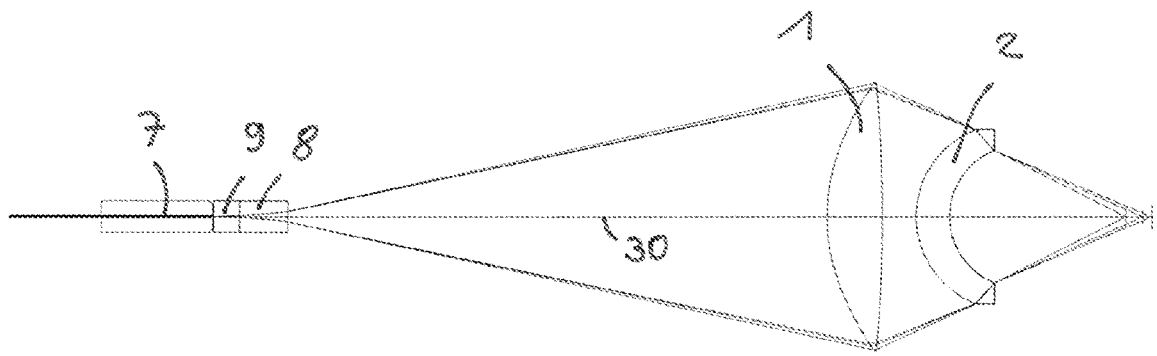

FIG. 6 shows an exemplary embodiment in which the divergence of one of the light bundles exiting from the optical fiber 7 with numerical aperture of 0.07 is advantageously enlarged with a refractive divergent lens 8 to a value $NA_{PH}=0.22$. By the enlargement of the numerical aperture $NA_{PH}$ by means of the divergent lens 8 a substantially shorter structural design of the measurement head is achieved. This in particular allows the distance between the optical fiber 7 and the optical lens system in the measurement head to be reduced to approx. ⅓. As a result of the fiber-sided oblique polishing of the divergent lens 8, which is brought into direct contact with the optical fiber 7 in this example, the retroreflections of the fiber front side 17 are simultaneously minimized. FIG. 7 shows a further exemplary embodiment in which the divergence of a light bundle exiting from the optic fiber 7 is advantageously enlarged by means of an optical element 8.

Instead of a refractive divergent lens, a gradient-index divergent lens 8 is used as optical element in the exemplary embodiment in FIG. 7. The gradient-index divergent lens 8 has a radial, preferably almost parabolic, refractive index profile with minimal refractive index on the optical axis 30. The gradient-index lens 8 has the advantage in comparison to a refractive lens that the planar optical surfaces allow it to be cost-effectively produced in large quantities.

In the exemplary embodiment in FIG. 7 a distance element 9 is advantageously located between the optical fiber 7 and the gradient-index divergent lens 8, in order to minimize retroreflections between the fiber 7 and the gradient-index lens 8, which can have a higher refractive index than the optical fiber 7.

Figure 8:
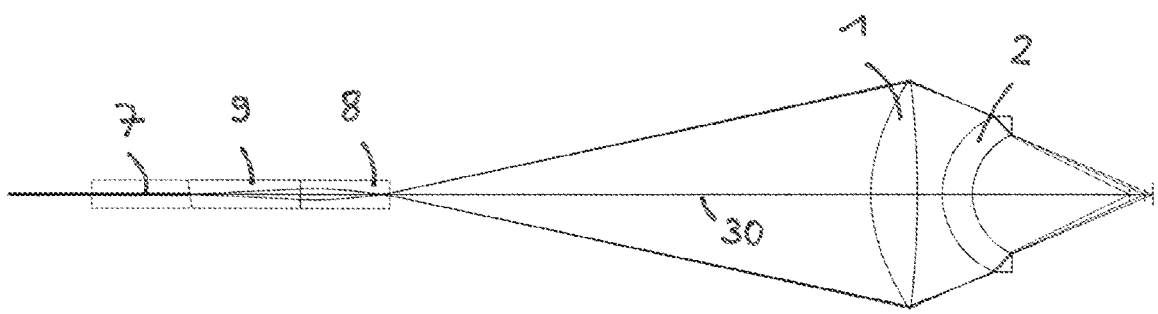

FIG. 8 shows a further exemplary embodiment, in which the divergence of a light bundle exiting the fiber optic 7 is advantageously enlarged by means of an optical element in the form of a gradient-index lens 8. Unlike in the previous embodiment, the gradient-index lens 8 is a converging lens. The gradient-index converging lens 8 has a radial, preferably almost parabolic, refractive index profile with maximal refractive index on the optical axis 30. As in the previously described gradient-index divergent lens, planar optical surfaces allow it to be cost-effectively produced in large quantities. As in the previous exemplary embodiment, a distance element 9 is located between the optical fiber 7 and the gradient-index converging lens 8, in order to minimize retroreflections between the optical fiber 7 and the gradient-index converging lens 8 with high refractive index.

Figure 9:
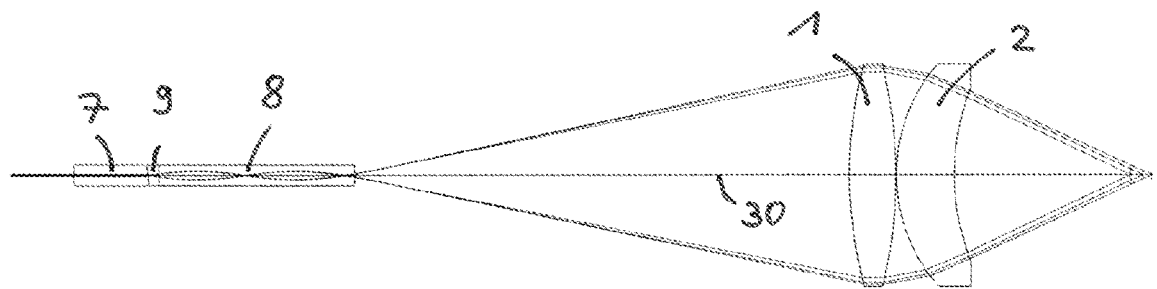

FIG. 9 shows a further exemplary embodiment, in which the divergence of a light bundle exiting the fiber optic 7 is advantageously enlarged by means of an optical element in the form of a gradient-index lens 8. In this exemplary embodiment the gradient-index lens 8 is a gradient-index converging lens, as in the previous exemplary embodiment, which has a radial, preferably almost parabolic, refractive index profile with maximal refractive index on the optical axis 30. Such a radial refractive index profile with almost parabolic form generates a continuous, cosinusoidal beam path within the gradient-index converging lens 8, the period of which is the pitch length. In the exemplary embodiment in FIG. 9 the length of the gradient-index converging lens 8 is approx. equal to the pitch length, and therefore the gradient-index converging lens images the light entry surface in two intermediate images. This embodiment avails itself of the dependency of the pitch length of a gradient-index lens on the wavelength. Due to the fact that the pitch length increases with increasing wavelength, the intermediate images already have chromatic shift, i.e., they are shifted somewhat towards each other on the optical axis. This reinforces the entire chromatic aberration of the measurement head and advantageously enlarges the measurement region. This is particularly advantageous for applications in which the measurement head is to have particularly small dimensions. In the exemplary embodiment in FIG. 9 the measurement region is approx. 20% larger than a measurement region, which would result solely from the chromatic aberration of the optical lens system.

Figure 10:
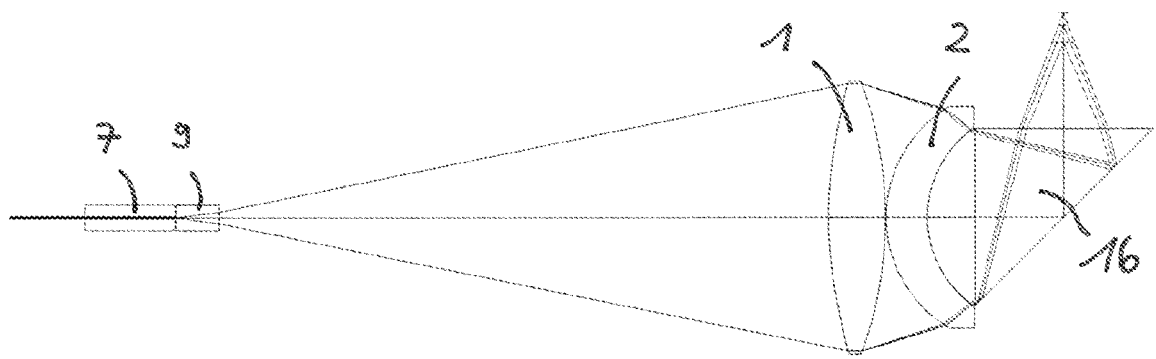

FIG. 10 shows an exemplary embodiment in which a prism is arranged in the measurement head as beam deflector element 16. This diverts the light bundle laterally, preferably by an angle of 90°, towards the measurement region. This is in particular advantageous for measuring hollow spaces and objects in flat interspaces. Instead of a prism, for example, a mirror can also be used as beam deflector element 16. When a deflection prism is used for deflecting beams, a spherical aberration by the optical glass path of the prism 16 is preferably compensated by adjusting the radiuses and the aspherical lens surface of the optical lens system.

The beam deflection in the exemplary embodiment in FIG. 10 ensues between the measurement region and the second refractive lens 2 of the optical lens system facing the measurement region. This allows a particularly small lateral expansion of the measurement head to be achieved. The arrangement of the beam deflector element 16 between the measurement object and the optical lens system is only expedient on the basis of the necessary optical path thereto when the numerical aperture $NA_{MR}$ on the side of the measurement region is no greater than approximately 0.57. The numerical aperture in the measurement space in the embodiment in FIG. 10 is, for example, $NA_{MR}=0.40$.

Figure 11:
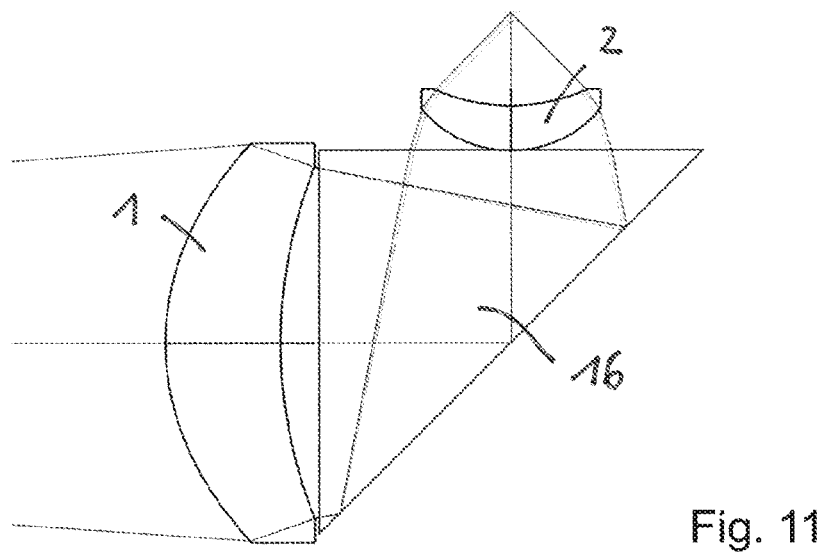

Alternatively, however, it is also possible that the beam deflection ensues between the two lenses 1, 2, or between the light source and the optical lens system. This is then in particular expedient when the measurement region is comparatively small and a higher numerical aperture $NA_{MR}$ is used in the measurement region. FIG. 11 shows an exemplary embodiment in which the beam deflector element 16, which is, for example, a 90° deflection prism, is arranged between the first lens 1 and the second lens 2 of the optical lens system 5. The numerical aperture $NA_{MR}$ in the measurement space in this embodiment equals $NA_{MR}=0.7$.

The invention is not limited due to the description on the basis of the exemplary embodiments. Instead, the invention comprises every new feature as well as every combination of features, which in particular includes every combination of features included in the claims, even if such feature or claim is not explicitly specified in the claims or exemplary embodiments.

The invention claimed is:

1. A device for contactless optical distance measurement, the device comprising:
   a light source;
   a light analysis unit; and
   a measurement head,
   wherein the light source is a polychromatic light source, which is suitable for emitting light of a continuous spectrum into the measurement head,
   wherein the light analysis unit is suitable for receiving and for spectrally analyzing received light from the measurement head,
   wherein the measurement head has an aperture opening for entry of the light of the light source into the measurement head and for exit of the received light from the measurement head towards the light analysis unit,
   wherein the measurement head has an optical lens system, which has a chromatic longitudinal aberration,
   wherein the optical lens system consists only of a first refractive lens and a second refractive lens,
   wherein the first refractive lens has an aspherically curved lens surface,
   wherein the optical lens system has such a chromatic longitudinal aberration that a measurement region, which equals an axial focus shift of the optical lens system between the wavelengths 450 nm and 700 nm, is between 0.2 mm inclusively and 10 mm inclusively, wherein both the first refractive lens and the second refractive lens have an optical material with an Abbe number $20 \leq v_d \leq 41$, and wherein a product of the measurement region and a square of a numerical aperture on a side of the measurement region is between 100 µm inclusively and 450 µm inclusively.

2. The device according to claim 1, wherein the second refractive lens has an aspherically curved lens surface.

3. The device according to claim 1, wherein a product of a radius of the aperture opening and of the numerical aperture on the side of the aperture opening is between 1.0 µm inclusively and 5.5 µm inclusively.

4. The device according to claim 1, wherein the light source and the light analysis unit are connected with the measurement head by an optical fiber.

5. The device according to claim 4, wherein the aperture opening of the measurement head is formed by a fiber end face of the optical fiber.

6. The device according to claim 5, wherein an optical element is arranged on a fiber end face facing the optical lens system.

7. The device according to claim 6, wherein the optical element is an optical window.

8. The device according to claim 6, wherein the optical element is a refractive divergent lens.

9. The device according to claim 6, wherein the optical element is a gradient-index divergent lens.

10. The device according to claim 6, wherein the optical element is a gradient-index converging lens.

11. The device according to claim 6, wherein the optical element is a gradient-index lens, which images a light spot of the light source formed by the fiber end face in one or more intermediate images.

12. The device according to claim 6, further comprising a distance element arranged between the fiber end face and the optical element.

13. The device according to claim 12, wherein the fiber end face and a surface of the distance element facing the fiber end face is configured obliquely to an optical axis.

14. The device according to claim 6, wherein the fiber end face and a surface of the optical element facing the fiber end face is configured obliquely to an optical axis.

15. The device according to claim 1, further comprising a beam deflector element arranged in the measurement head.

16. A device for contactless optical distance measurement, the device comprising:
    a light source;
    a light analysis unit; and
    a measurement head,
    wherein the light source is a polychromatic light source, which is suitable for emitting light of a continuous spectrum into the measurement head,
    wherein the light analysis unit is suitable for receiving and for spectrally analyzing received light from the measurement head,
    wherein the measurement head has an aperture opening for entry of the light of the light source into the measurement head and for exit of the received light from the measurement head towards the light analysis unit,
    wherein the measurement head has an optical lens system, which has a chromatic longitudinal aberration,
    wherein the optical lens system consists only of a first refractive lens and a second refractive lens,
    wherein the first refractive lens has an aspherically curved lens surface,
    wherein the optical lens system has such a chromatic longitudinal aberration that a measurement region, which equals an axial focus shift of the optical lens system between the wavelengths 450 nm and 700 nm, is between 0.2 mm inclusively and 10 mm inclusively,
    wherein both the first refractive lens and the second refractive lens have an optical material with an Abbe number $20 \leq v_d \leq 41$,
    wherein a product of the measurement region and a square of a numerical aperture on a side of the measurement region is between 100 µm inclusively and 450 µm inclusively, and
    wherein a product of a radius of the aperture opening and of the numerical aperture on the side of the aperture opening is between 1.0 µm inclusively and 5.5 µm inclusively.

* * * * *